(12) United States Patent
Wasmuht et al.

(10) Patent No.: US 8,524,083 B2
(45) Date of Patent: Sep. 3, 2013

(54) BEER FILTER

(76) Inventors: Klaus-Karl Wasmuht, Ellingen (DE); Cornelia Folz, Berlin (DE); Kurt Stippler, Marzling (DE); Thomas Albrecht, Beilngries (DE); Heinz Humele, Thalmassing (DE); Michael Thomas Stein, Freising (DE)

( * ) Notice: Subject to any disclaimer, the term of this patent is extended or adjusted under 35 U.S.C. 154(b) by 427 days.

(21) Appl. No.: 12/529,143

(22) PCT Filed: Jan. 31, 2008

(86) PCT No.: PCT/EP2008/000793
§ 371 (c)(1),
(2), (4) Date: Feb. 4, 2010

(87) PCT Pub. No.: WO2008/107051
PCT Pub. Date: Sep. 12, 2008

(65) Prior Publication Data
US 2010/0151100 A1    Jun. 17, 2010

(30) Foreign Application Priority Data
Mar. 5, 2007    (EP) .................................. 07004460

(51) Int. Cl.
| | |
|---|---|
| *B01D 29/64* | (2006.01) |
| *B01D 35/00* | (2006.01) |
| *B01D 35/20* | (2006.01) |
| *B01D 35/30* | (2006.01) |
| *B01D 63/00* | (2006.01) |
| *B01D 29/88* | (2006.01) |
| *C12C 7/16* | (2006.01) |
| *C12H 1/07* | (2006.01) |
| *C12H 1/075* | (2006.01) |

(52) U.S. Cl.
USPC ... 210/321.85; 426/495; 210/106; 210/321.6; 210/321.63; 210/321.84; 210/323.1; 210/413; 210/433.1; 210/435; 210/436; 210/472; 210/388; 210/788

(58) Field of Classification Search
USPC .................... 210/321.85, 321.76, 433.1, 436, 210/472
See application file for complete search history.

(56) References Cited

U.S. PATENT DOCUMENTS 3,771,290 A * 11/1973 Stethem ......................... 96/210
3,795,088 A * 3/1974 Esmond ......................... 96/182
(Continued)

FOREIGN PATENT DOCUMENTS

| AU | 440841 B2 | 9/1973 |
| DE | 2753864 A1 | 6/1979 |

(Continued)

OTHER PUBLICATIONS

Office Action for Korean Application No. 10-2009-7020491 mailed Jul. 20, 2011.

(Continued)

*Primary Examiner* — Benjamin Kurtz
(74) *Attorney, Agent, or Firm* — Marshall, Gerstein & Borun LLP (57) ABSTRACT

A filter device and a method for the filtration of beer, where, for an improved and simplified filtration, the filter includes a nonfiltrate chamber having a nonfiltrate inlet and a nonfiltrate outlet, wherein the nonfiltrate flows into the nonfiltrate chamber substantially tangentially to the walls thereof, and the bottom of the nonfiltrate chamber is constructed at least partially as a filter. The filter also includes a filtrate chamber underneath the bottom, and a filtrate outlet.

24 Claims, 11 Drawing Sheets

(56) References Cited

U.S. PATENT DOCUMENTS

| | | | | |
|---|---|---|---|---|
| 3,827,562 | A | * | 8/1974 | Esmond .................. 210/304 |
| 4,137,756 | A | | 2/1979 | Cosack et al. |
| 4,280,902 | A | * | 7/1981 | Jacobsen et al. ............ 209/731 |
| 4,690,762 | A | * | 9/1987 | Katsura ..................... 96/212 |
| 4,699,013 | A | | 10/1987 | Kroner |
| 6,251,296 | B1 | * | 6/2001 | Conrad et al. ............... 210/806 |
| 6,579,456 | B2 | * | 6/2003 | Frey et al. .................. 210/255 |

FOREIGN PATENT DOCUMENTS

| | | | |
|---|---|---|---|
| DE | 3924658 | A1 | 1/1991 |
| EP | 0204098 | A2 | 12/1986 |
| EP | 1138364 | A1 | 10/2001 |
| JP | 51136564 | A | 11/1976 |
| JP | 55009237 | | 1/1980 |
| JP | 60166014 | A | 8/1985 |
| JP | 02075332 | A | 3/1990 |
| JP | 07501988 | | 3/1995 |
| JP | 07171359 | A | 7/1995 |
| JP | 07265055 | A | 10/1995 |
| JP | 2001046815 | A | 2/2001 |
| JP | 2005503266 | A | 2/2005 |

OTHER PUBLICATIONS

Search Report for European Application No. PCT/EP2008/000793.
Office Action for Japanese Application No. P2009-552082 Mailed Apr. 10, 2012.

* cited by examiner

BEER FILTER

CROSS-REFERENCE TO RELATED APPLICATION

The present application claims the benefit of priority of International Patent Application No. PCT/EP2008/000793 filed on Jan. 31, 2008, which claims priority of European Patent Application No. 07004460.7 filed Mar. 5, 2007. The entire text of the priority application is incorporated herein by reference in its entirety.

FIELD OF THE DISCLOSURE

The present disclosure relates to a filter device, in particular for the filtration of beer, and a corresponding method.

BACKGROUND

During the manufacture of beer, the yeast cells and other solids contained in the beer must be removed. Such substances must be separated off so that they do not separate off by themselves over the time and make the beer turbid. As the yeast has a particle size of about 5 to 10 μm, it is necessary to use so-called microfilters that work, for example, within a range of 10-1 to 10-2 μm. Up to now, the beer has mainly been filtered by means of precoat filters, e.g. by means of filter cartridges. With such precoat filters, up to now diatomite is mainly used as filter aid. Due to the toxicity of diatomite and the problems of disposing of the same, one is looking for alternatives to this technology. For example, crossflow filter modules offer one alternative, however, they only have a small filter capacity and moreover get clogged very quickly.

SUMMARY OF THE DISCLOSURE

Starting from this, the object underlying the present disclosure is to provide an improved filter device, in particular for the filtration of beer, as well as a corresponding method by which beer can be filtered in a simple and efficient as well as environmentally safe manner.

By the nonfiltrate to be filtered being introduced into the nonfiltrate chamber tangentially to the wall of the nonfiltrate chamber, a rotating flow can annually form along the wall and make the contents of the nonfiltrate chamber rotate over the bottom that is at least partially designed as a filter. Towards the center, the speed of this flow decreases, so that the nonfiltrate can there leave the nonfiltrate chamber again via the nonfiltrate outlet, resulting in a continuous flow through the nonfiltrate chamber.

The nonfiltrate supplied tangentially under pressure, preferably via a pump, is forced to form a helical circulating flow directed downwards, like in a hydrocyclone. By the throttle effect in the lower part of the nonfiltrate chamber, portions of the external swirl are constantly deflected to an internal turbulent flow directed upwards. The nonfiltrate flowing over the bottom passes through the filter or the filter sections, is thus filtered and can then leave the filter device.

Due to the centrifugal force in the nonfiltrate chamber, larger and heavier particles collect at the inner walls of the nonfiltrate chamber and sink downwards to the center of the bottom. Microfiltration is then accomplished via the filter or the filter sections embodied in the bottom of the nonfiltrate chamber. A compact filter design is thus formed that permits simple and efficient filtration. That means, only one filter device is required for coarse and fine filtration.

Advantageously, the nonfiltrate outlet is arranged essentially in the center of the upper side of the nonfiltrate chamber as here the nonfiltrate rises upwards due to the internal swirl.

Advantageously, the nonfiltrate outlet comprises an outlet pipe of which the cross-sectional area diminishes towards the top. By the diminution of the cross-section of the outlet pipe, the flow rate of the nonfiltrate is increased towards the top whereby the nonfiltrate can be efficiently removed.

Advantageously, the filter disk is a microfilter disk that filters out particles within a range of >10-1 to 10-2 μm, in particular within a range of >0.2 to 1.8 μm. Thus, the filter according to the disclosure can reliably filter out yeasts and solids.

Preferably, the microfilter is designed as microfilter disk and preferably formed of a disk or plate perforated by means of a laser. Such a plate has sufficient stability, can be easily fabricated and permits pore sizes within a μm range with at the same time large free screen surfaces.

Such a filter can be either embodied to be self-supporting or rest on a support, where the support can be embodied as backing fabric, in particular as metallic fabric or a widemeshed grid extending three-dimensionally, where the grid openings of the support are essentially larger than the pore size of the filter to ensure optimal flow and stability.

The diameter of the nonfiltrate chamber can diminish towards the bottom, or else the bottom of the nonfiltrate chamber can be arched. The diameter of the filtrate chamber, too, can diminish towards the bottom, or the bottom can be arched.

Together, the nonfiltrate and filtrate chambers can form an essentially wok-like shape. If the diameter of the filtrate chamber slightly diminishes towards the bottom, there will be a throttle effect of the circulating flow that facilitates the upward flow in the center of the nonfiltrate chamber.

Advantageously, the nonfiltrate outlet is connected to a return conduit conducting the nonfiltrate in the circuit back to the filtrate chamber and/or to a buffer/feeder tank.

Thus, the nonfiltrate discharged from the nonfiltrate chamber can be again supplied to the filtration, where a continuous flow over the bottom, i.e. over the filter, is possible.

According to a preferred embodiment, the filtrate outlet comprises a circular conduit connected to the filtrate chamber via several openings. This permits a steady removal of the filtrate.

Furthermore, the filter device comprises means that vibrate the bottom preferably in a pulsed manner. The bottom or the filter, respectively, can be vibrated either during the complete filter procedure or else at intervals. The excitation prevents a clogging of the pores of the filter or of the surface of the filter.

Advantageously, the filter device comprises a movably rotating brush on the bottom of the nonfiltrate chamber for cleaning purposes. This can prevent the surface of the filter from clogging completely. The brush can also loosen deposits which can then be removed through the nonfiltrate outlet by a backwash procedure. The brush can be moved by a magnet passing outside, as in an aquarium, or by a drive shaft. The brush can also be driven by a magnet as in a magnetic levitation train.

According to a preferred embodiment, at least one opening is embodied in the bottom of the nonfiltrate chamber in which a corresponding filter disk is arranged. Such a filter bottom can be very easily prepared, and several small filter disks can be also integrated in the bottom. In particular if the bottom does not have a flat design, it is advantageous to arrange several filter disks with smaller dimensions in the bottom. A bottom embodied in this way also has a greater stability. Then, filter materials that cannot be fabricated with a large surface can be used.

According to a further preferred embodiment, the filtrate chamber is arranged underneath the nonfiltrate chamber and also extends laterally around the filtrate chamber. Such an arrangement is particularly space-saving and compact as here the nonfiltrate chamber can be arranged more or less in the filtrate chamber.

Advantageously, the walls of the nonfiltrate chamber are at least partially embodied as a bellow. This has the advantage that vibrations generated by the means that vibrate the bottom of the nonfiltrate chamber can be absorbed.

The means that vibrate the bottom of the nonfiltrate chamber can preferably comprise a vibrating shaft extending in a sleeve through the filtrate chamber and knocking on the bottom. The sleeve can be arranged at one end at the wall or the bottom of the nonfiltrate chamber, and at the other end at the wall or the bottom of the filtrate chamber and be at least in sections embodied as a bellow. This solution allows the vibrating shaft to vibrate the bottom of the nonfiltrate chamber without contacting the liquid in the nonfiltrate chamber. In the process, vibrations are efficiently absorbed by the bellow in the sleeve.

It is advantageous for the outlet pipe as well as the nonfiltrate inlet to be arranged to be height adjustable. Thus, the height of the outlet pipe as well as the height of the nonfiltrate inlet can be adjusted to a corresponding filtering process.

Advantageously, a pressure control valve is arranged in the filtrate outlet so that the pressure in the filtrate chamber can be adjusted.

Preferably, the pressure in the filtrate chamber and in the nonfiltrate chamber are kept above the saturated vapor pressure of $CO_2$, so that no $CO_2$ outgases. Here, the pressure must be adjusted such that the pressure in the nonfiltrate chamber is higher than the pressure in the filtrate chamber, so that the nonfiltrate can pass through the filter. For a sufficient rotating flow to form, the nonfiltrate is preferably introduced tangentially at a speed of 1 to 10 m/s, where in a feed conduit speeds of up to about 6 m/s prevail, and directly at the inlet into the nonfiltrate chamber, speeds of up to about 10 m/s occur.

It is advantageous to provide a filter system with several filter devices that are arranged in series or in parallel to each other to increase the filter capacity.

BRIEF DESCRIPTION OF THE DISCLOSURE

The present disclosure will be illustrated below in greater detail with reference to the following figures:

FIG. 2b shows the enlarged area A of FIG. 2a.

FIG. 2c shows an enlarged partial section along line I-I in FIG. 2a.

FIG. 11b shows an enlarged section of a section along line A-A in FIG. 11a.

DETAILED DESCRIPTION

Figure 1:
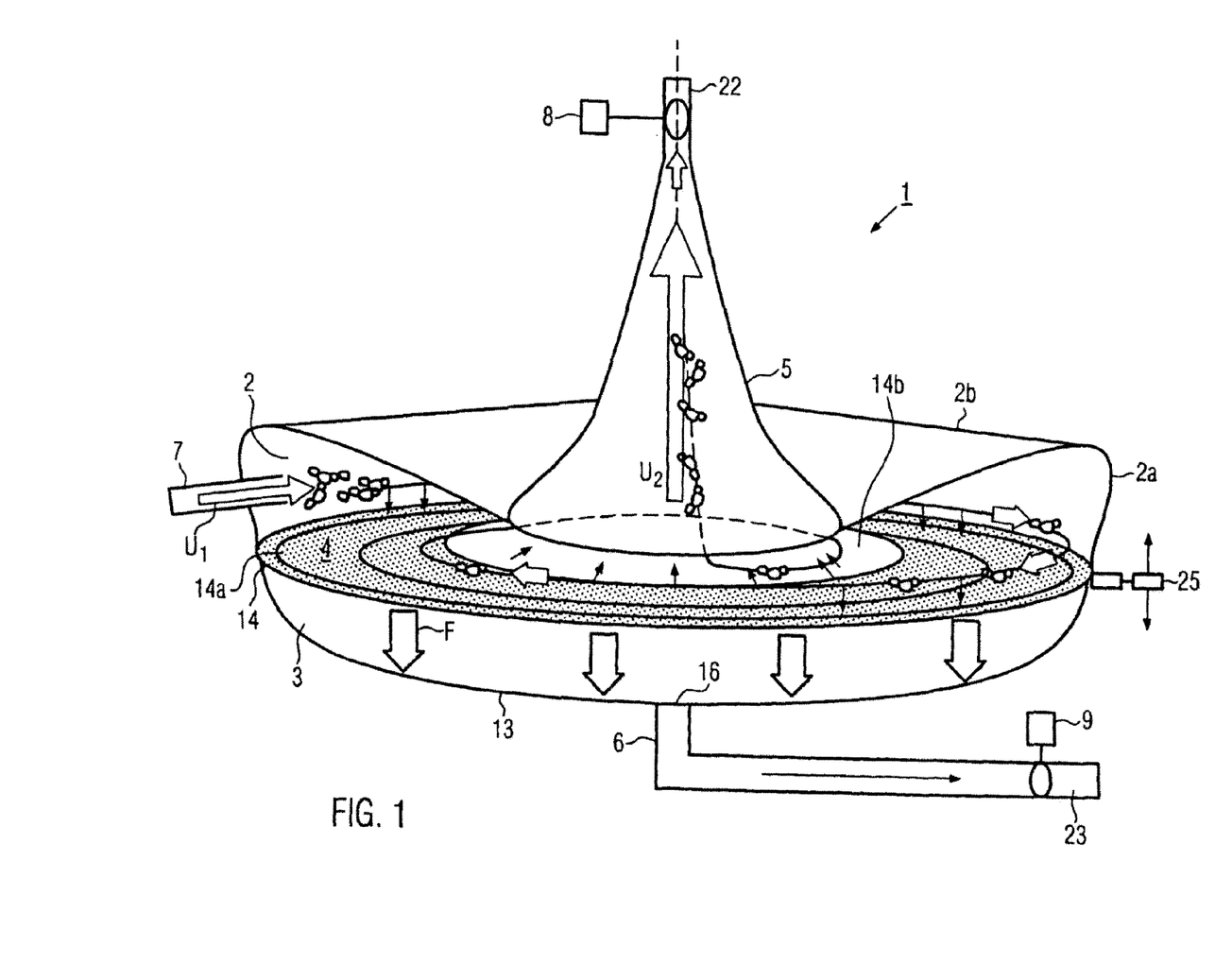
FIG. 1 shows a schematic sectional representation of a first embodiment of the present disclosure.

FIG. 1 shows, in a schematic representation, a cross-sectional through a filter device 1 according to the present disclosure that is intended to make clear the principle of the disclosure. The filter 1 comprises a nonfiltrate chamber 2 into which nonfiltrate is pumped via a nonfiltrate inlet 7, e.g. from a buffer/feeder tank 17, by means of a pump 20 (cf. e.g. FIG. 5). The inlet 7 is designed such that the liquid flows in essentially tangentially to the lateral wall 2a of the nonfiltrate chamber 2. Here, for example an inlet pipe can extend essentially tangentially to the wall 2a, or else an inlet element (not shown) can be for example provided at the inner surface of the wall 2a and deflect the nonfiltrate flow such that it flows essentially tangentially to the wall 2a, such that this results in a rotating circulating flow, comparable to a hydrocyclone. The tangential inlet is not discussed in greater detail here, as such inlets are known in particular in connection with whirlpools and hydrocyclones. For the construction of the nonfiltrate inlet, it is only essential that the flow flows against the inner wall of the nonfiltrate chamber such that a flow is formed annularly along the wall that makes the contents of the nonfiltrate chamber rotate. It is also possible to design the inlet such that the entering filtrate is fanned out in the vertical direction upwards. Here, the inlet then comprises e.g. an inlet element with several openings arranged one upon the other or a slot.

The nonfiltrate chamber comprises a round cross-sectional area, the diameter of the nonfiltrate chamber here being larger than its height. The bottom of the nonfiltrate chamber 2 is at least partially embodied as filter 4 and here comprises the filter disk 4. In the filter device 1, the bottom 14 separates the nonfiltrate chamber 2 from the filtrate chamber 3 arranged underneath the bottom 14, here the filter disk 4.

The nonfiltrate chamber 2 furthermore comprises a nonfiltrate outlet 5 starting at the upper side 2b of the nonfiltrate chamber 2. The nonfiltrate outlet 5 is arranged in the center of the upper side 2b. The nonfiltrate outlet 5 is embodied as outlet pipe the cross-sectional area of which diminishes from the upper side 2b of the nonfiltrate chamber towards the top. The nonfiltrate outlet 5 ends in a conduit 22 in which a control valve 8 is arranged, so that the flow of the nonfiltrate as well as the pressure in the nonfiltrate chamber can be adjusted or controlled. In this embodiment, the diameter of the nonfiltrate chamber diminishes downwards, i.e. in the direction of the filter disk 4. The diameter of the filtrate chamber 3, too, diminishes towards the bottom. The nonfiltrate chamber 2 and the filtrate chamber 3 can thus together have the shape, for example, of a wok.

The filtrate chamber 3 comprises at least one filtrate outlet 6 that is connected to the filtrate chamber 3 via at least one opening 16 to discharge the filtrate via a filtrate discharge 23. In the filtrate discharge 23, too, a control valve 9 is provided to adjust the flow of the filtrate whereby the pressure in the filtrate chamber can be adjusted or controlled, respectively.

In this embodiment, the height of the nonfiltrate chamber diminishes from the outer wall 2a towards the nonfiltrate outlet 5.

The filter disk 4 is preferably a microfilter disk that filters out particles of a size of >10-1 to 10-2 µm, advantageously particles of a size of >0.2 to 1.8 µm.

Figure 2A:
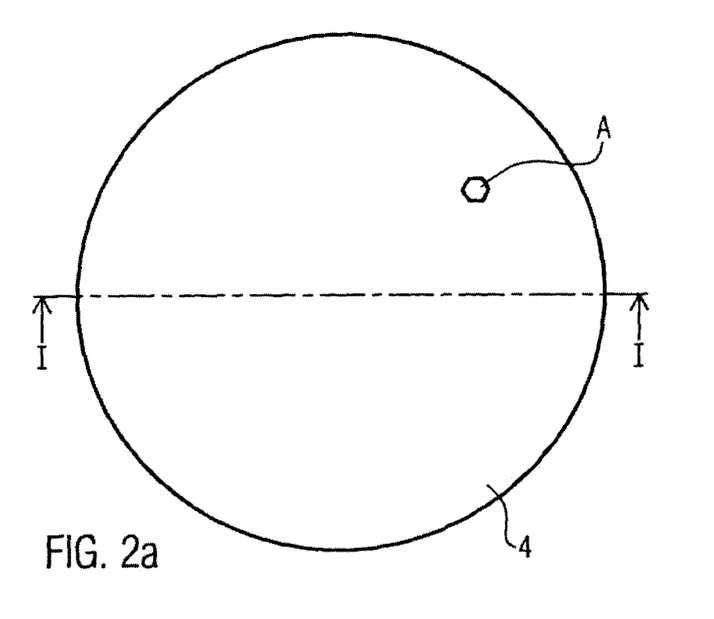
FIG. 2a shows a plan view onto a filter disk.
Figure 2B:
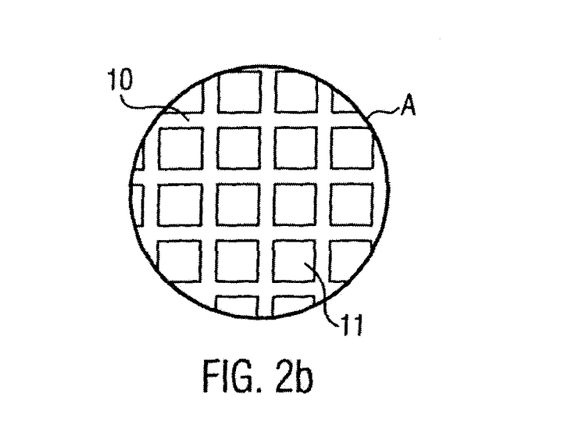
Figure 2C:
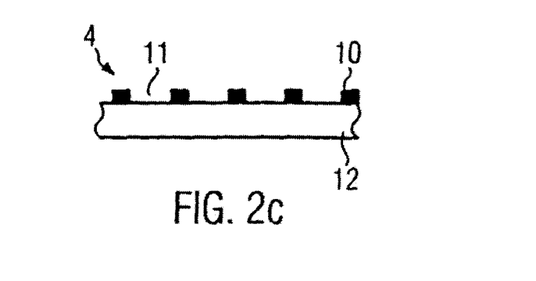

It is possible for the microfilter disk to comprise a photolithographically generated grid 10 as can be seen in particular in FIGS. 2a, b, c.

FIG. 2a shows a plan view onto the circular filter disk 4, FIG. 2b showing an enlargement of section A. As can be clearly seen in FIG. 2b, the grid 10 comprises pores 11 through which the nonfiltrate passes and is filtered in the process. FIG. 2c shows an enlarged section of a section along line I-I in FIG. 2a. Here, it becomes clear that the grid 10 is applied onto a support, i.e. a support disk 12 having a greater thickness than the photolithographically generated grid 10. The support 12 or the support disk 12 is for example embodied as backing fabric, in particular as metallic fabric. It can also be embodied as three-dimensionally extending widemeshed grid of which the grid size is larger than that of the grid 10, so that the filtrate can easily pass through it. The support 12 imparts sufficient stability to the photolithographically generated grid 10.

Figure 11A:
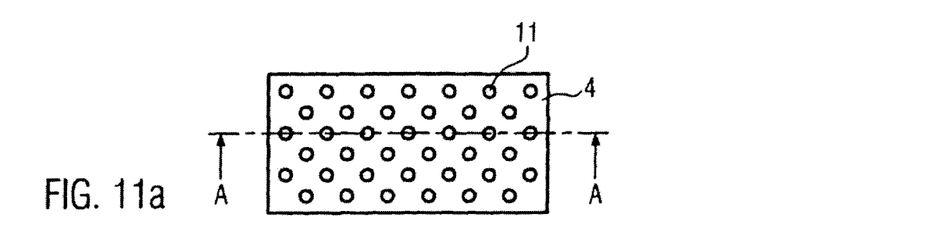
FIG. 11a shows an enlarged section of a filter 4.
Figure 11B:
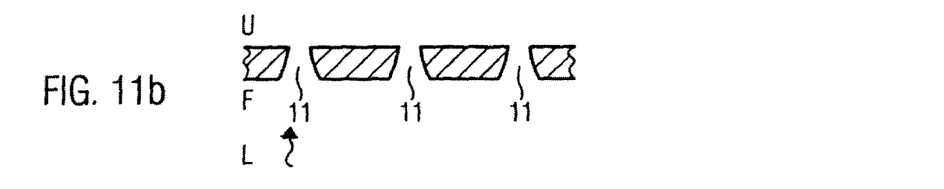

According to a particularly preferred embodiment, the microfilter disk is formed of a disk or plate perforated by means of a laser, as can be taken in particular from FIGS. 11a and 11b. The filter disk 4 comprises pores 11 having a hole width within a range of for example 0.2-1.8 µm. Such a hole width is suited, for example, for the filtration of beer. For filtering tensides and spores, the hole width should be within a range of ≦0.01 µm. The pores 11 are generated by means of a laser. For this, for example a 0.3-1 mm thick CrNi steel sheet or a correspondingly thick teflon plate is suited as filter disk material. These materials are CIP/SIP capable which is in particular required in beer brewing or else in the pharmaceutical industry. As can be taken in particular from FIG. 11b which shows an enlarged partial section along line A-A in FIG. 11a, the pores 11 have a smaller cross-section on the upper side than on the lower side which is due to the manufacture. Here, the lower side corresponds to the side from which the pores are generated by means of a laser as indicated by arrow L. The hole width stated above refers to the smaller hole width at the upper side. The filter disk 4 is arranged in the filter device such that the side of the pores 11 having the smaller diameter faces the nonfiltrate chamber, and the side having the larger pore diameter faces the nonfiltrate chamber. Such an arrangement permits a slower clogging of the pores.

The filter disk 4 perforated by means of a laser as illustrated in connection with FIGS. 11a and 11b can be either embodied to be self-supporting, or it can also be arranged on a corresponding support 12 as the above-described photolithographically generated filter disk 4 does.

Figure 13:
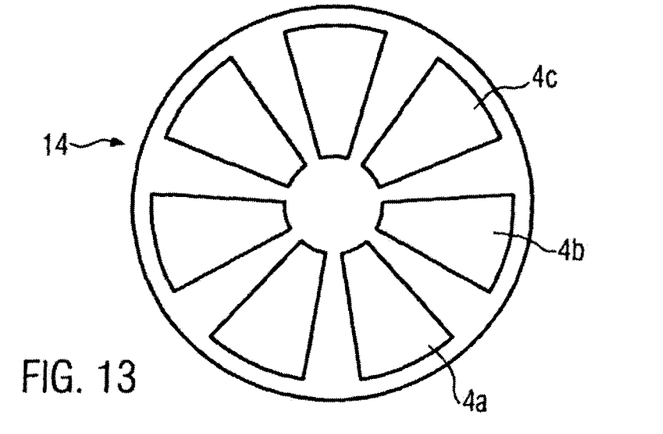
FIG. 13 shows a plan view onto the bottom of the nonfiltrate chamber comprising several filter disks.
Figure 14:
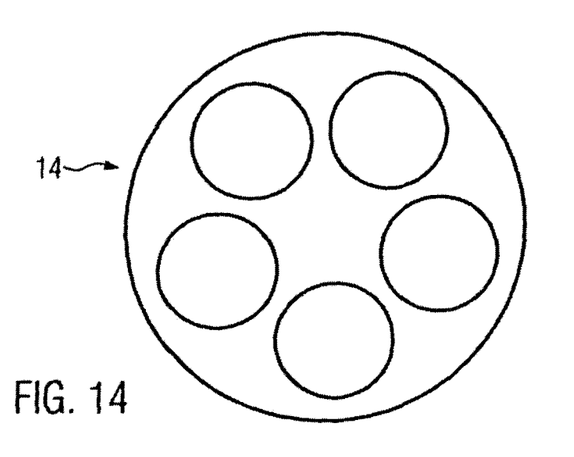
FIG. 14 shows a plan view onto another embodiment of a bottom of the nonfiltrate chamber according to the present disclosure.
Figure 15:
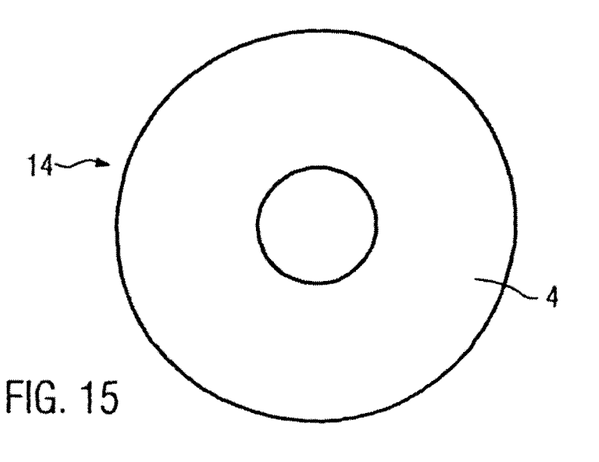
FIG. 15 shows a plan view of another embodiment of a bottom of the nonfiltrate chamber according to the present disclosure.

The filter disk 4 can extend across the whole bottom 14 of the nonfiltrate chamber, as is represented in FIG. 2a. However, it is also possible to only partially embody the filter bottom 14 as filter. As can be taken, for example, from FIG. 15, it is possible to only embody an external ring of the bottom 14 as filter 4 or as filter disk 4, respectively. The central area which is essentially situated under the nonfiltrate outlet is not embodied as filter and comprises a section essentially impermeable to the nonfiltrate. As can be seen in FIGS. 13 and 14, in the bottom 14 of the nonfiltrate chamber 2, several openings can be provided into which corresponding filter disks 4a, b, c, . . . 4n are inserted. The filter disks can then be round, as can be taken from FIG. 14, however, they can also have any other shape, e.g. an oval or polygonal shape, as can be taken, for example, from FIG. 13. Then, the junctions between the bottom 14 and the filter disks 4a-4n are sealed.

To prevent a clogging of the filter disk 4, the filter 1 according to the disclosure preferably comprises means 25 to vibrate the filter disk 4. Preferably, the means 25 vibrate the filter disk 4 in a pulsed manner. Such means can comprise, for example, a vibrating head arranged at the outer wall of the filter, preferably at the same level as the filter disk 4, which transmits the vibrations to the filter disk 4. The filter 1 according to the disclosure can also comprise a mechanical vibrator that pushes directly or indirectly against the bottom or the filter 4 in a pulsed manner. Thus, fouling in the pores/channels and at the surface of the micro-screens can be prevented efficiently. Here, the filter can be vibrated during the complete filtration or else at intervals.

Figure 3:
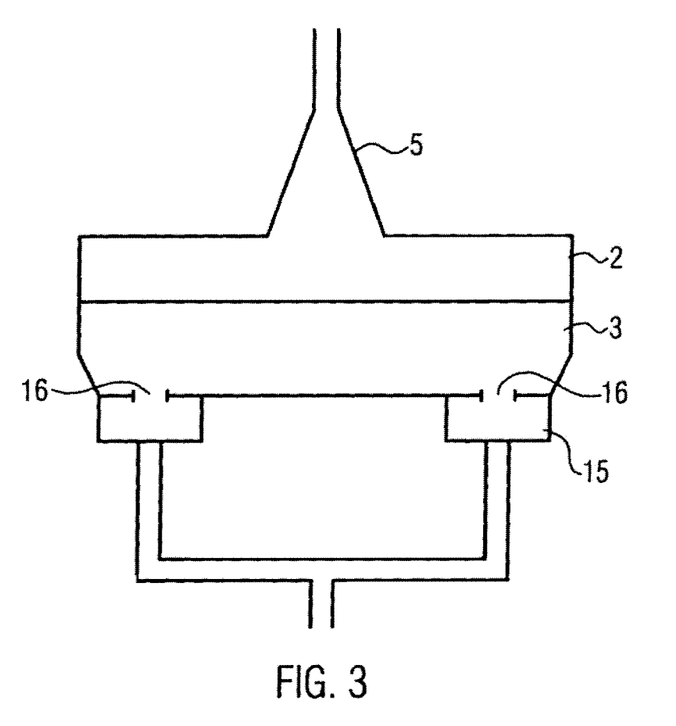
FIG. 3 shows another embodiment of the present disclosure.

FIG. 3 shows another embodiment of the present disclosure where the outlet 6 comprises a circular conduit 15 connected to the filtrate chamber 3 via several openings 16. Here, the circular conduit 16 is arranged at the bottom of the filtrate chamber 3. However, it can also laterally adjoin the nonfiltrate chamber 3 or be arranged to adjoin the nonfiltrate chamber laterally and at the bottom. The circular conduit 15, however, then preferably comprises several openings via which the filtrate is conducted into the filtrate discharge 23.

Figure 12:
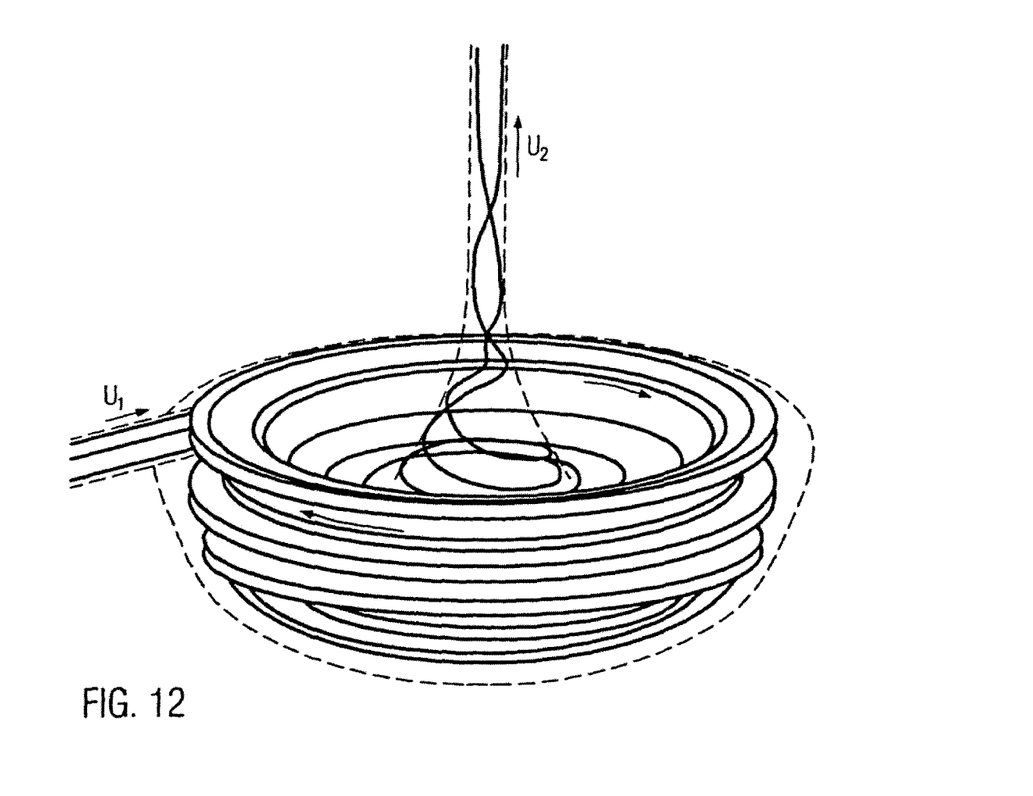
FIG. 12 schematically shows the course of the flow in the nonfiltrate chamber according to the present disclosure.

Below, the functional principle of the filter according to the disclosure will be illustrated more in detail. As is represented in FIG. 1 by arrow U1, nonfiltrate is supplied from a buffer/feeder tank 17 via a conduit 19 (cf. e.g. FIG. 5) essentially tangentially via the nonfiltrate inlet 7, so that the nonfiltrate tangentially flows to the side wall 2a of the nonfiltrate chamber 2. The nonfiltrate is pumped in with a pump 20 (cf. FIG. 5) at a high speed of about 1-10 m/s. As represented by the arrows, at the inner wall of the nonfiltrate chamber 2, the nonfiltrate is forced to an external annular circulating flow directed downwards (in the area 14a) that makes the contents of the nonfiltrate chamber rotate over the bottom 14, here the filter disk 4. In the process, the flow rate including its load decreases towards the center of the nonfiltrate chamber. By a throttle effect in the lower part, portions of the external flow, i.e. the external swirl, are constantly deflected to a turbulent flow U2 directed upwards inside. The area 14b where an upwards flow is formed is shown as white surface in FIG. 1. Thus, the nonfiltrate can leave the nonfiltrate chamber 2 in the central area of the nonfiltrate chamber 2 via the nonfiltrate outlet 5. The diminution of the cross-section of the nonfiltrate outlet 5 facilitates the discharge. The course of the flow can be seen even better in FIG. 12.

By the centrifugal force, larger and heavier particles of the nonfiltrate collect at the inner wall 2a of the nonfiltrate chamber. The discharged nonfiltrate flow U2, however, is also still loaded with particles and can be again supplied to the nonfiltrate chamber 2 or a buffer/feeder tank in the cycle via a return conduit 22. The speed of the nonfiltrate outlet 2 and the pressure in the nonfiltrate chamber can be adjusted by means of a control valve 8. The nonfiltrate rotating in the nonfiltrate chamber 4 over the bottom 14 passes transversely to the bottom through the filter disk 4 (or the filter disks 4a, b, c . . . n) downwards as is represented by the arrows F. The nonfiltrate is thus filtered through the filter disk.

Thus, during filtration, two effects are advantageously combined, namely the centrifugal separation as well as the microfiltration through the filter 4. The filtrate in the filtrate chamber 3 can be supplied to a filtrate discharge 23 via a corresponding filtrate outlet 6. The discharge speed of the filtrate as well as the pressure in the filtrate chamber 3 can also be adjusted by means of the control valve 9.

The pressure in the nonfiltrate chamber 2 and in the filtrate chamber 3 is adjusted such that it is above the saturated vapor pressure of $CO_2$, so that no $CO_2$ outgases during the filtration of beer. The pressure in the nonfiltrate chamber and in the filtrate chamber is adjusted by means of the nonfiltrate inlet 7 and the control valves 8 and 9 such that the pressure in the nonfiltrate chamber 2 is higher than the pressure in the filtrate chamber 3.

Figure 7:
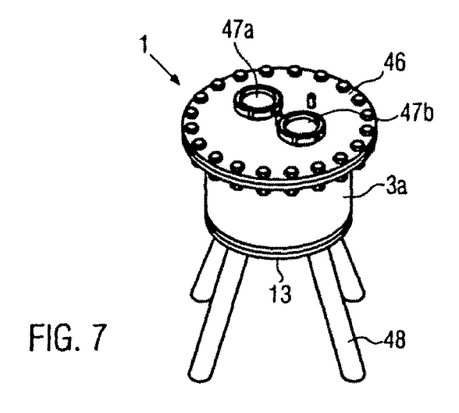
FIG. 7 shows a second embodiment according to the present disclosure in a perspective representation.

FIG. 7 shows a preferred embodiment of the present disclosure in a perspective representation. The embodiment shown in FIG. 7 essentially corresponds to the embodiment shown in FIGS. 1 to 3. The bottom 14 of the nonfiltrate chamber as well as the filter disks can also be embodied as described in connection with FIGS. 2, 3, 11 and 13-15. The functional principle of the embodiment of FIG. 7 also corresponds to the functional principle illustrated in connection with FIG. 1.

FIG. 7 shows the outer wall of the essentially hollow-cylindrically embodied filtrate chamber 3 which in this case has an arched bottom 13. The bottom 13, however, can also have a flat design. The nonfiltrate chamber 3 is here pressure-tightly sealed to the top by the cover plate 46. The cover plate 46 comprises at least one inspection glass 47a, b. The filter device 1 here comprises several legs 48.

Figure 8:
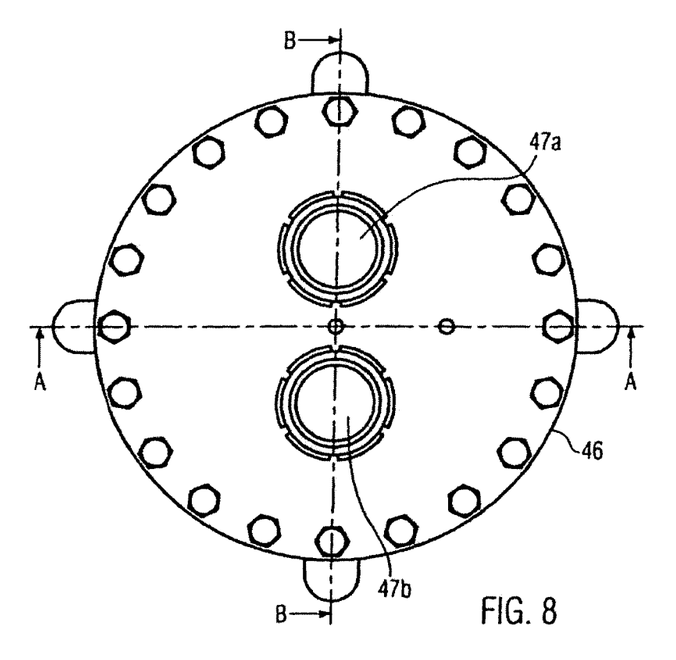
FIG. 8 shows a plan view onto the embodiment of FIG. 7.
Figure 9:
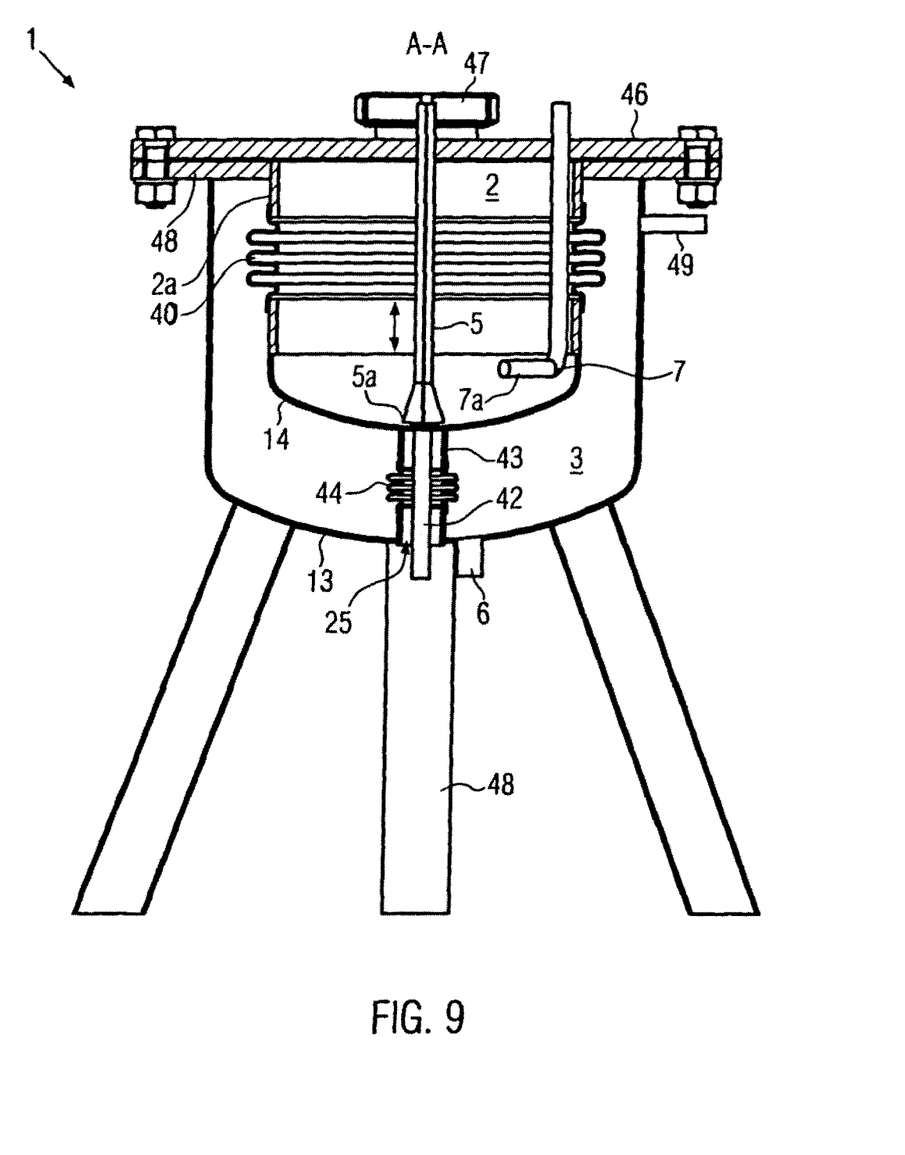
FIG. 9 shows a section along line A-A in FIG. 8.
Figure 10:
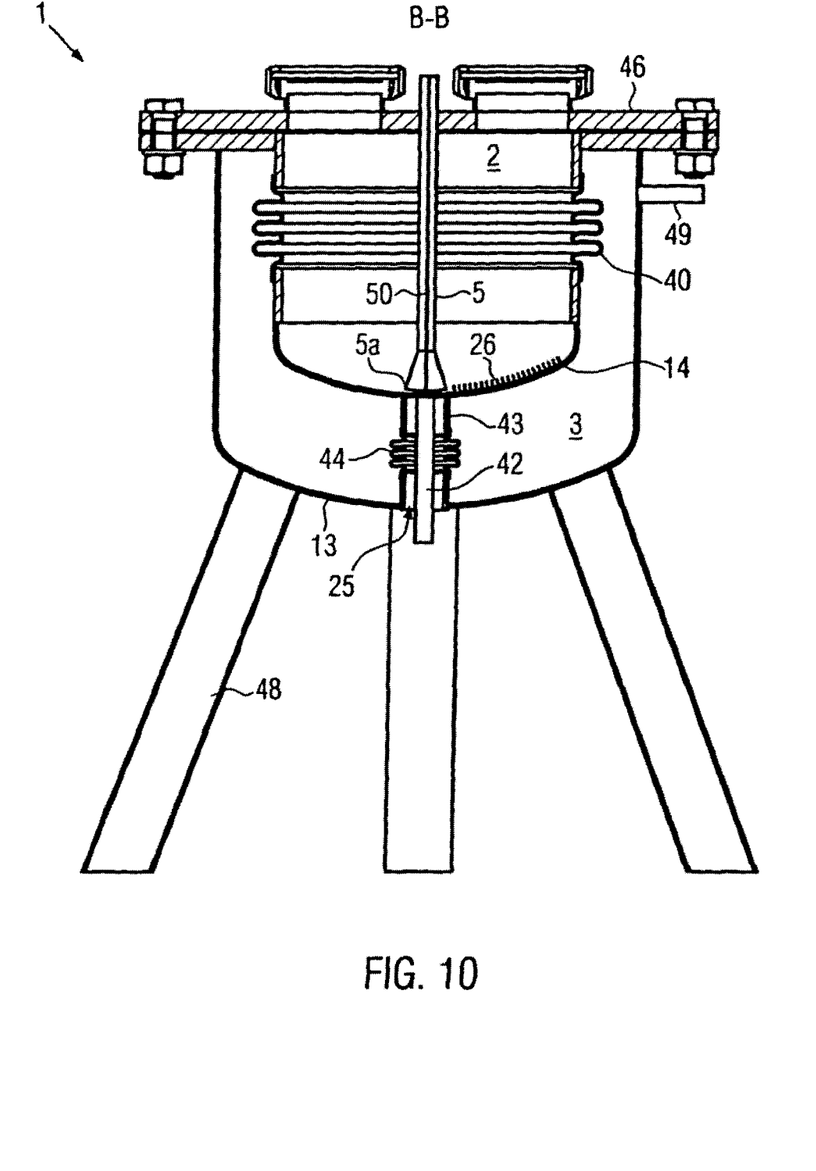
FIG. 10 shows a section along line B-B of FIG. 8.

FIG. 8 is a plan view onto the filter device represented in FIG. 7. FIG. 9 is a section along line A-A in FIG. 8, and FIG. 10 is a section along the line in FIG. 8. As can be taken in particular from FIGS. 9 and 10, here the filtrate chamber 3 is arranged underneath and laterally around the filtrate chamber 2. The walls 2a of the nonfiltrate chamber 2 are also pressure-tightly sealed to the top by the cover plate 14. The nonfiltrate chamber 2 is held in the filtrate chamber 3 by means of the mountings 48 that are connected to the wall 2a of the nonfiltrate chamber 2. The bottom 14 of the nonfiltrate chamber 2 is also arched, but it can also have a flat design.

As can be taken from FIGS. 9 and 10, the nonfiltrate outlet 5 extends from the upper side of the filter device 1 into the nonfiltrate chamber 2. The nonfiltrate outlet 5 is here embodied as outlet pipe which comprises a cross-section tapered towards the top at least in the lower area, as also described in connection with FIG. 1. Preferably, the pipe 5 forming the nonfiltrate outlet is arranged to be height adjustable, so that the distance of the lower edge 5a of the outlet pipe to the bottom 14 is variable. The section of the outlet pipe 5 tapered towards the top can be arranged to be exchangeable, where sections having different opening angles can be attached. The inlet 7 is here tangential, also as described in connection with FIG. 1, that means that the nonfiltrate flows in in such a manner that the annular circulating flow is formed. Here, the inlet 7 comprises an inlet pipe introduced into the nonfiltrate chamber 2 from the top and comprising an inflow element 7a lying against the wall 2a and conducting the nonfiltrate flow to the wall 2a. The inlet 7 can also be arranged to be height adjustable. The height adjustability of the inlet 7 and of the nonfiltrate outlet 5 permits to adapt the inlet and outlet of the nonfiltrate to different processes.

The filter device moreover comprises a filtrate outlet 6 arranged in the bottom 13 of the filtrate chamber 3. Reference numeral 49 designates a vent of the filtrate chamber. The vent can be opened or closed by means of a non-depicted valve.

This filter device 1, too, comprises means 25 to vibrate the bottom 14 of the nonfiltrate chamber. The means 25 comprise the vibrating shaft 42 adjoining the bottom 14 and making it vibrate. The vibrating shaft 42 extends through the sleeve or the tube 43. The sleeve 43 is arranged at one end at the bottom of the nonfiltrate chamber 2 and at the other end at the bottom of the filtrate chamber 3. Thus, the vibrating shaft 25 can reach the bottom 14 without passing through the filtrate. The sleeve 43 is at least partially embodied as a bellow 44 that absorbs the vibrations. Thus, the vibrations are not or only slightly transmitted to the housing of the filtrate chamber 3. Similarly, the wall 2a of the nonfiltrate chamber 2 is also at least partially embodied as a bellow 40, so that the vibrations of the bottom 14 are not transmitted to the cover plate 46 and to the walls of the filtrate chamber 3.

In this embodiment, at least the area opposite to the sleeve 43 is not embodied as filter but is designed to be impermeable to the nonfiltrate, so that no filtrate can flow into the sleeve 43. The functional principle of the filter shown in FIG. 7 corresponds to the functional principle shown in connection with FIG. 1.

Figure 4:
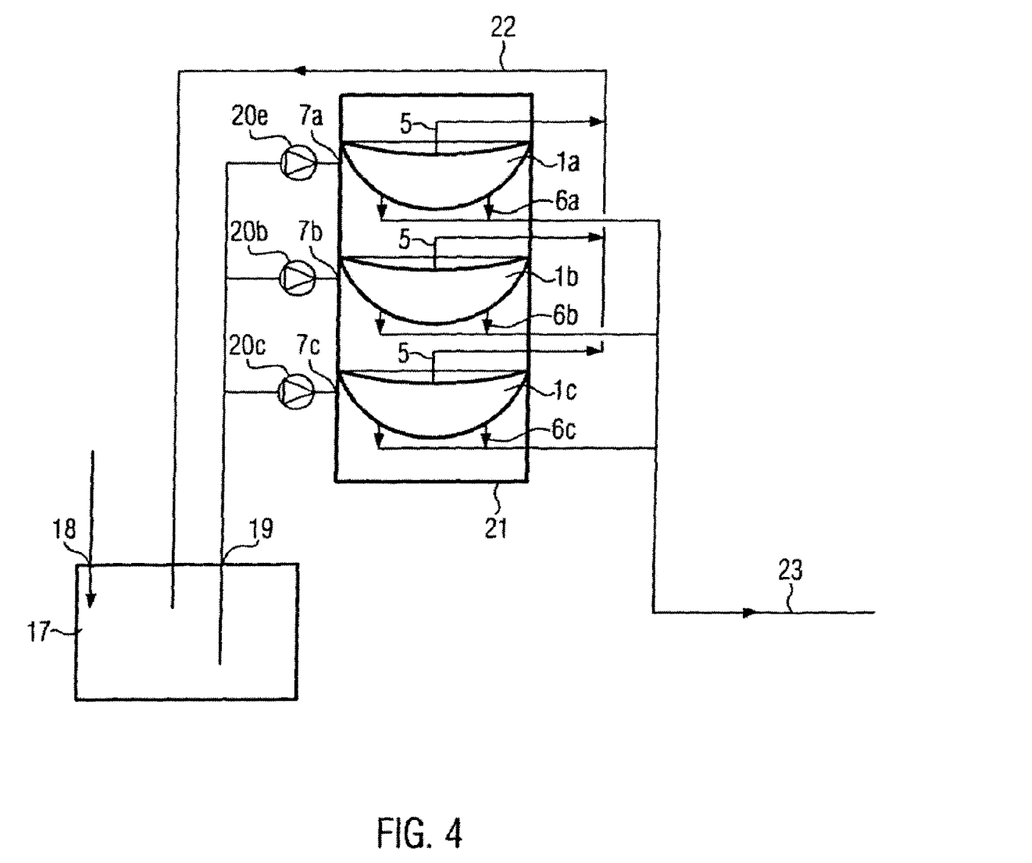
FIG. 4 shows a filter system with several filters arranged one upon the other.

To increase the capacity of the filter, several filter units 1a, b, c, can be combined to form one unit 21, as represented in FIG. 4. In this case, the individual filters 1a, b, c are simultaneously supplied with nonfiltrate from the buffer feeder tank 17 via a conduit 19 and corresponding pumps 20a, b, c. The nonfiltrate that is discharged via the nonfiltrate outlet 5 is here conducted back to the tank 17 in a mutual nonfiltrate return conduit 22, but it could also be immediately pumped again into the corresponding filters 1a, b, c via the pumps 20a, b, c. The filtrate outlets 6a, b, c, too, end in a mutual filter discharge 23. The buffer/feeder tank 17 is fed with nonfiltrate via a conduit 18.

Figure 5:
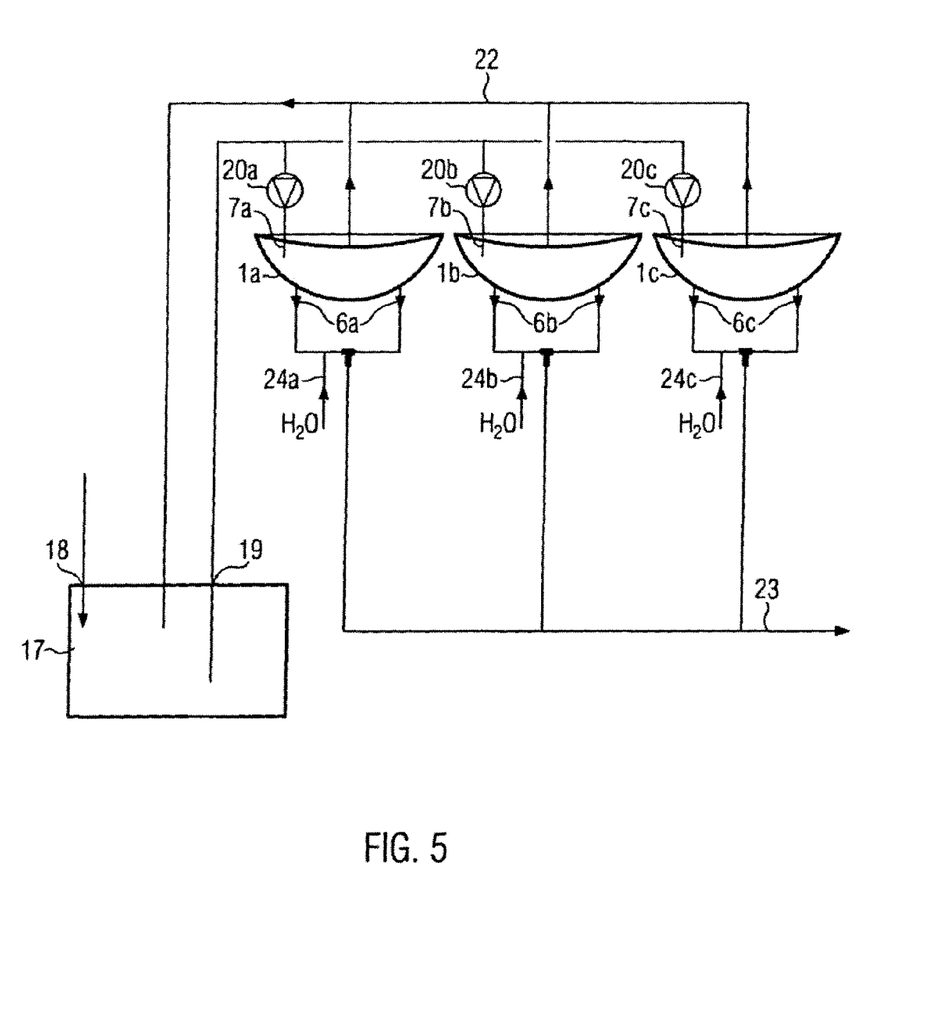
FIG. 5 shows a filter system with several filters arranged one next to the other.

FIG. 5 shows another arrangement essentially corresponding to the arrangement shown in FIG. 4, in which, however, the individual filters 1a, b, c are arranged one next to the other. In FIG. 5, a water backwash conduit or a CIP/SIP conduit (cleaning in place/sterilizing in place) 24a, b, c is shown via which e.g. water can be pumped into the corresponding filter 1a, b, c for cleaning purposes, so that deposits on the filter disk 4 can be discharged via the nonfiltrate outlet 5.

Figure 6:
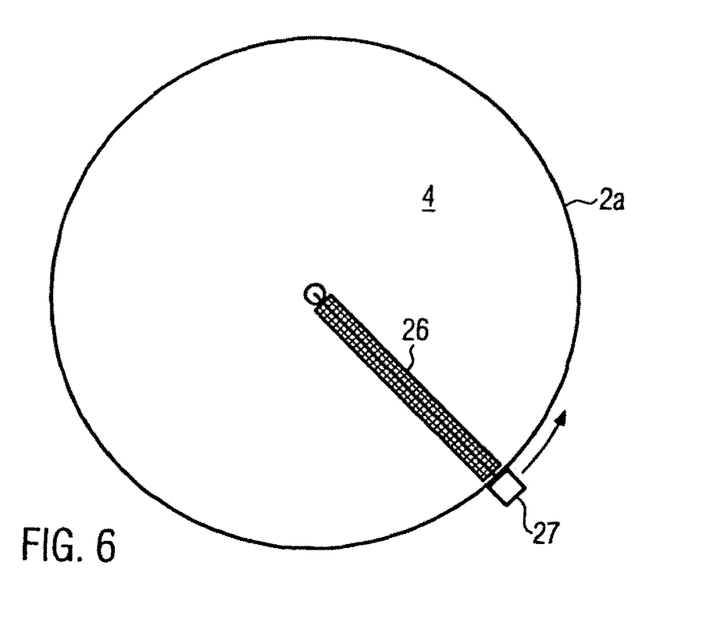
FIG. 6 shows means to clean the filter disk.

FIG. 6 furthermore shows means to clean the filter surface 4. Here, for example a brush 26 is movably arranged on the filter disk surface 8. The brush 26 passes over the surface of the filter 4. In this embodiment, the brush 26 comprises a metallic material in particular at the side facing the nonfiltrate chamber wall 2a. A magnet 27 that is arranged at the outer surface of the wall 2a in the area of the filter disk is moved to rotate, as represented by the arrow. The magnet 27 thus moves the brush 26 from outside, like in an aquarium or a magnet levitation device.

The brush loosens the impurities on the filter disk 4. The brush 26 can be, for example, also rotatably mounted in the center of the filter disk 4.

In the embodiment shown in FIGS. 7 to 10, the brush 26 can be driven to rotate by a drive shaft 50, as can be seen in particular in FIG. 10. The drive shaft 50 is in this case connected to a non-depicted motor. The drive shaft 50 here extends through the outlet pipe 5. However, the brush could also be driven via a drive shaft that extends through the sleeve 43 through the bottom 14 and drives the brush 26 from the bottom.

The nonfiltrate flow that is removed via the nonfiltrate discharge 5 can be supported by a non-depicted pump. The filtrate outlet, too, can be supported by a non-depicted pump. On the side of the filtrate, a circulation of the filtrate along the bottom side of the bottom 14 can be generated by means of a suited flow generation. This provides a transmembrane drop of pressure from the bottom that is constant and well-balanced across the screen surface.

According to the present disclosure, two effects are combined, that is the effect of a hydrocyclone where due to the centrifugal force very large and heavy components are pressed against the wall of the nonfiltrate chamber, as well as the effect of a microfiltration through the filter disk(s) 4. Thus, according to the present disclosure, one does not need a combination of a coarse filter and a fine filter, but only one filter unit.

The present filter or the filter method according to the disclosure has been described in connection with the filtration of beer. This type of filter, however, is equally suited, for example, for the filtration in the pharmaceutical field, where e.g. tensides and spores are to be filtered out.

The invention claimed is:

1. Filter device, in particular for the filtration of beer, comprising a nonfiltrate chamber having a nonfiltrate inlet and a nonfiltrate outlet, where the nonfiltrate inlet conducts the nonfiltrate essentially tangentially to the wall of the nonfiltrate chamber, and the bottom of the nonfiltrate chamber is at least partially embodied as a filter, and having a filtrate chamber arranged underneath the bottom and comprising a filtrate outlet, wherein the filter device comprises means to vibrate the bottom of the nonfiltrate chamber, wherein the side wall of the nonfiltrate chamber is at least partially embodied as a bellow.

2. Filter device according to claim 1, wherein the filter comprises at least one filter disk.

3. Filter device according to claim 1, wherein the nonfiltrate outlet is arranged essentially in the center of the upper side of the nonfiltrate chamber.

4. Filter device according to claim 1, wherein the nonfiltrate outlet comprises an outlet pipe of which the cross-sectional area diminishes towards the top.

5. Filter device according to claim 1, wherein the filter is a microfilter that filters out particles within a range of $>10^{-1}$ to $10^2$ μm.

6. Filter device according to claim 5, wherein the microfilter is a microfilter disk.

7. Filter device according to claim 5, wherein the filter rests on a support, and the support is embodied as one of backing fabric or as three-dimensionally extending wide-meshed grid.

8. Filter device according to claim 1, wherein one of the diameter of the nonfiltrate chamber diminishes towards the bottom, or the bottom of the nonfiltrate chamber is arched.

9. Filter device according to claim 1, wherein one of the diameter of the filtrate chamber diminishes towards the bottom, or the bottom of the filtrate chamber is arched.

10. Filter device according to claim 1, wherein the nonfiltrate outlet is connected to a return conduit conducting the nonfiltrate one of in the circuit back into the nonfiltrate chamber, into a buffer/feeder tank, or a combination thereof.

11. Filter device according to claim 1, wherein the filtrate outlet comprises a circular line connected to the filtrate chamber via several openings.

12. Filter device according to claim 1, wherein a movable, rotating brush is arranged on the bottom for cleaning purposes.

13. Filter device according to claim 12, wherein the brush is one of moved by a magnet passing at the outside of the wall of the nonfiltrate chamber, or it is moved by a drive shaft.

14. Filter device according claim 2, wherein at least one opening is embodied in the bottom of the nonfiltrate chamber, in which one corresponding filter disk each is arranged.

15. Filter device according to claim 1, wherein the filtrate chamber extends underneath and laterally around the nonfiltrate chamber.

16. Filter device according to claim 1, wherein the means comprise a vibrating shaft extending in a sleeve through the filtrate chamber and vibrating the bottom of the nonfiltrate chamber.

17. Filter device according to claim 16, wherein the sleeve is arranged at one end at one of the wall or the bottom of the nonfiltrate chamber and at the other end at one of the wall or the bottom of the filtrate chamber and is at least in sections embodied as a bellow.

18. Filter device according to claim 1, wherein one of an outlet pipe, the nonfiltrate inlet, or a combination thereof are arranged to be height adjustable.

19. Filter system with several filter devices according to claim 1, wherein several filter devices are arranged in one of series or in parallel to each other.

20. Filter device according to claim 1, wherein a pressure control valve is arranged in the filtrate outlet.

21. Filter device according to claim 5, wherein the microfilter filters out particles within a range of $>0.2$ to 1.8 μm.

22. Filter device according to claim 6, wherein the microfilter disk is formed of a disk perforated by means of a laser.

23. Filter device according to claim 7, wherein the backing fabric is metallic fabric.

24. Filter device, in particular for the filtration of beer, comprising a nonfiltrate chamber having a nonfiltrate inlet and a nonfiltrate outlet, where the nonfiltrate inlet conducts the nonfiltrate essentially tangentially to the wall of the nonfiltrate chamber, and the bottom of the nonfiltrate chamber is at least partially embodied as a filter, and having a filtrate chamber arranged underneath the bottom and comprising a filtrate outlet, wherein the filter device comprises means to vibrate the bottom of the nonfiltrate chamber, wherein the means comprise a vibrating shaft extending in a sleeve through the filtrate chamber and vibrating the bottom of the nonfiltrate chamber.

* * * * *